United States Patent
Matsutani et al.

(10) Patent No.: US 9,049,087 B2
(45) Date of Patent: Jun. 2, 2015

(54) COMMUNICATION DEVICE AND COMMUNICATION SYSTEM

(75) Inventors: Takashi Matsutani, Osaka (JP); Shigenori Motooka, Osaka (JP); Keishi Kajiwara, Osaka (JP)

(73) Assignee: MegaChips Corporation, Osaka-shi (JP)

(*) Notice: Subject to any disclaimer, the term of this patent is extended or adjusted under 35 U.S.C. 154(b) by 0 days.

(21) Appl. No.: 13/809,818

(22) PCT Filed: Jun. 10, 2011

(86) PCT No.: PCT/JP2011/063371
§ 371 (c)(1),
(2), (4) Date: Jan. 11, 2013

(87) PCT Pub. No.: WO2012/014579
PCT Pub. Date: Feb. 2, 2012

(65) Prior Publication Data
US 2013/0107976 A1     May 2, 2013

(30) Foreign Application Priority Data
Jul. 30, 2010  (JP) ................... 2010-171494

(51) Int. Cl.
*H04L 27/26* (2006.01)
*H04L 27/00* (2006.01)

(52) U.S. Cl.
CPC ........ *H04L 27/2649* (2013.01); *H04L 27/0012* (2013.01); *H04L 27/2601* (2013.01)

(58) Field of Classification Search
CPC .............. H04L 1/0003; H04L 27/0008; H04L 27/0012; H04L 27/2649
USPC ............... 375/324, 340; 329/316, 348
See application file for complete search history.

(56) References Cited

U.S. PATENT DOCUMENTS 6,359,934 B1  3/2002 Yoshida
8,204,144 B2  6/2012 Takada et al.
(Continued)

FOREIGN PATENT DOCUMENTS

CN  1476703 A   2/2004
JP  2005 5935   1/2005
(Continued)

OTHER PUBLICATIONS

International Search Report Issued Jul. 26, 2011 in PCT/JP11/63371 Filed Jun. 10, 2011.
International Preliminary Report on Patentability issued on Feb. 5, 2013 in PCT/JP2011/063371 filed on Jun. 10, 2011.
(Continued)

*Primary Examiner* — Curtis Odom
(74) *Attorney, Agent, or Firm* — Oblon, McClelland, Maier & Neustadt, L.L.P.

(57) ABSTRACT

A communication device includes: a reception element for receiving a radio signal modulated in a first modulation scheme or a second modulation scheme; a first demodulation element for demodulating the received radio signal in a first demodulation scheme corresponding to the first modulation scheme; a second demodulation element for demodulating the received radio signal in a second demodulation scheme corresponding to the second modulation scheme; and a modulation scheme detection section for detecting a modulation scheme of the received radio signal. The received radio signal includes modulation scheme determination information. The modulation scheme detection section detects the modulation scheme of the received radio signal based on a result of demodulation of the modulation scheme determination information performed by the first demodulation element and a result of demodulation of the modulation scheme determination information performed by the second demodulation element.

11 Claims, 9 Drawing Sheets

(56) References Cited

U.S. PATENT DOCUMENTS

| | | | |
|---|---|---|---|
| 2003/0166395 A1* | 9/2003 | Golitschek Edler Von Elbwart et al. | 455/130 |
| 2004/0097207 A1* | 5/2004 | Sandaralingam | 455/205 |
| 2005/0034053 A1* | 2/2005 | Jacobsen et al. | 714/800 |
| 2008/0037622 A1* | 2/2008 | Kohyama | 375/232 |
| 2010/0266059 A1* | 10/2010 | Murakami et al. | 375/261 |

FOREIGN PATENT DOCUMENTS

| | | |
|---|---|---|
| JP | 2005-303455 A | 10/2005 |
| JP | 2006 109064 | 4/2006 |
| JP | 2009 267945 | 11/2009 |
| JP | 2010 35032 | 2/2010 |

OTHER PUBLICATIONS

English Translation of the International Preliminary report on Patentability with written opinion issued on Feb. 14, 2013 in PCT/JP2011/063371 filed on Jun. 10, 2011.

Combined Chinese Office Action and Search Report issued on May 14, 2014 in Patent Application No. 201180037588.2 (with partial English language translation based on Japanese translation).

Office Action issued Apr. 1, 2014 in Japanese Patent Application No. 2010-171494 (with partial English translation).

Office Action issued Oct. 7, 2014 in Japanese Patent Application No. 2010-171494 (with partial English language translation).

Office Action issued Feb. 10, 2015 in Chinese Patent Application No. 201180037588.2 (with English translation).

* cited by examiner

COMMUNICATION DEVICE AND COMMUNICATION SYSTEM

TECHNICAL FIELD

The present invention relates to communication technologies.

BACKGROUND ART

Conventionally, there has been a wireless communication system in which communication between devices or between apparatuses is performed wirelessly.

For example, Patent Document 1 proposes a wireless communication system that adopts a method (adaptive modulation scheme) in which an optimum modulation scheme is selected in accordance with communication environments to thereby enhance a transmission efficiency.

PRIOR-ART DOCUMENTS

Patent Documents

Patent Document 1: Japanese Patent Application Laid-Open No. 2010-35032

SUMMARY OF THE INVENTION

Problems to be Solved by the Invention

In a technique disclosed in Patent Document 1, an optimum modulation scheme is selected in the transmitter side and, before a modulation scheme is changed, the transmitter side notifies the receiver side of the modulation scheme to be used in and after the next time. This causes a possibility that the communication may be continued and stable communication performance cannot be ensured if the modulation scheme to be used in and after the next time cannot be notified to the receiver side due to a rapid change of the communication environments.

Therefore, an object of the present invention is to provide a technique that allows stable communication performance to be ensured even when a modulation scheme is changed in accordance with communication environments.

Means for Solving the Problems

To solve the above-described problem, a first aspect of a communication device according to the present invention includes: a reception element for receiving a radio signal modulated in a first modulation scheme or a second modulation scheme; a first demodulation element for demodulating the radio signal in a first demodulation scheme corresponding to the first modulation scheme; a second demodulation element for demodulating the radio signal in a second demodulation scheme corresponding to the second modulation scheme; and a modulation scheme detection element for detecting the modulation scheme of the radio signal. The radio signal includes predetermined information. The modulation scheme detection element detects the modulation scheme of the radio signal based on a result of demodulation of the predetermined information performed by the first demodulation element and a result of demodulation of the predetermined information performed by the second demodulation element.

A second aspect of the communication device according to the present invention is the first aspect, in which the modulation scheme detection element detects the modulation scheme of the radio signal based on identification of which one of the first demodulation element and the second demodulation element has accurately demodulated the predetermined information.

A third aspect of the communication device according to the present invention includes: a reception element for receiving a radio signal modulated in a first modulation scheme or a second modulation scheme; a storage element for storing the radio signal received by the reception element; a demodulation element for performing a demodulation process on the radio signal received from the storage element; a control element for controlling setting of the demodulation element and causing the demodulation element to implement any one of first demodulation element and a second demodulation element, the first demodulation element being for demodulating a first demodulation scheme corresponding to the first modulation scheme, the second demodulation element being for demodulating a second demodulation scheme corresponding to the second modulation scheme; and modulation scheme detection element for detecting the modulation scheme of the radio signal. The radio signal includes predetermined information. The control element sequentially implements the first demodulation element and the second demodulation element. The modulation scheme detection element detects the modulation scheme of the radio signal based on results of demodulation of the predetermined information that are sequentially obtained by the first demodulation element and the second demodulation element.

A fourth aspect of the communication device according to the present invention is the third aspect, in which: hardware that implements the first demodulation element and hardware that implements the second demodulation element are configured to share at least part of the hardware; and the control element controls setting of shared hardware, to implement any one of the first demodulation element and the second demodulation element.

A fifth aspect of the communication device according to the present invention is any of the first to fourth aspects, in which the communication device performs wireless communication in accordance with a communication protocol that defines rules for communication in a smart grid.

A communication system according to the present invention includes: a first communication device; and a second communication device that performs wireless communication with the first communication device. The first communication device includes: modulation scheme determination means for determining, from a first modulation scheme and a second modulation scheme, an optimum modulation scheme in accordance with communication environments; and transmission means for transmitting a radio signal modulated in the optimum modulation scheme. The second communication device includes: reception means for receiving a radio signal transmitted from the first communication device; first demodulation means for demodulating the radio signal in a first demodulation scheme corresponding to the first modulation scheme; second demodulation means for demodulating the radio signal in a second demodulation scheme corresponding to the second modulation scheme; and modulation scheme detection means for detecting the modulation scheme of the radio signal. The radio signal includes predetermined information. The modulation scheme detection means detects the modulation scheme of the radio signal based on a result of demodulation of the predetermined information performed by the first demodulation means and a result of demodulation of the predetermined information performed by the second demodulation means.

A sixth aspect of the communication device according to the present invention includes: reception means for receiving a radio signal modulated in a first modulation scheme or a second modulation scheme; first demodulation means for demodulating the radio signal in a first demodulation scheme corresponding to the first modulation scheme; and modulation scheme detection means for detecting the modulation scheme of the radio signal. The radio signal includes predetermined information. The modulation scheme detection means detects the modulation scheme of the radio signal based on whether or not the first demodulation means has accurately demodulated the predetermined information.

A seventh aspect of the communication device according to the present invention is the sixth aspect, in which, in a case where the first demodulation means has accurately demodulated the predetermined information, the modulation scheme detection means detects that the modulation scheme of the radio signal is the first modulation scheme, and in a case where the first demodulation means has not accurately demodulated the predetermined information, the modulation scheme detection means detects that the modulation scheme of the radio signal is the second modulation scheme.

Effects of the Invention

The present invention enables stable communication performance to be ensured even in a case where the modulation scheme is changed in accordance with communication environments.

These and other objects, features, aspects and advantages of the present invention will become more apparent from the following detailed description of the present invention when taken in conjunction with the accompanying drawings.

EMBODIMENT FOR CARRYING OUT THE INVENTION

In the following, some embodiments of the present invention will be described with reference to the drawings.

1. First Embodiment

[1-1. Communication System]

Figure 1:
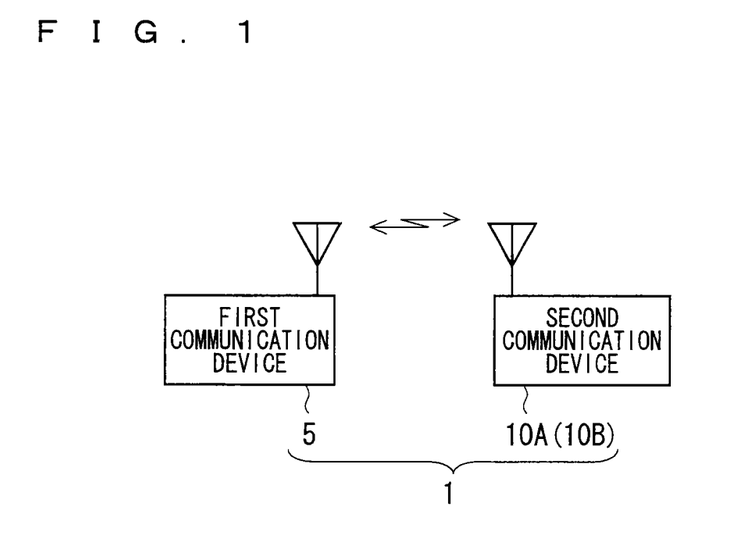
FIG. 1 A block diagram of a communication system.

FIG. 1 is a block diagram of a communication system 1 according to a first embodiment. As shown in FIG. 1, the communication system 1 includes a first communication device 5 and a second communication device 10A. Hereinafter, the first communication device 5 is also referred to simply as the communication device 5, and the second communication device 10A is also referred to simply as the communication device 10A. Although a case where there are one communication device 5 and one communication device 10A is illustrated herein, the numbers of the communication devices 5 and 10A are not limited to the illustrated case.

The communication devices 5 and 10A are configured to perform wireless communication. Here, a function of the first communication device 5 as a transmitter will be mainly described, and a function of the second communication device 10A as a receiver will be mainly described. However, it may be possible that both the first communication device 5 and the second communication device 10 have transmission and reception functions.

The communication device 5 as a transmitter wirelessly transmits transmission data by using any of a plurality of modulation schemes. The communication device 10A as a receiver receives a radio signal transmitted from the communication device 5, and detects a modulation scheme of the radio signal. Then, the communication device 10A demodulates the received radio signal by using a demodulation scheme corresponding to the detected modulation scheme.

In this manner, the communication system 1 is configured to perform wireless communication in any of a plurality of modulation schemes.

[1-2. First Communication Device]

Figure 2:
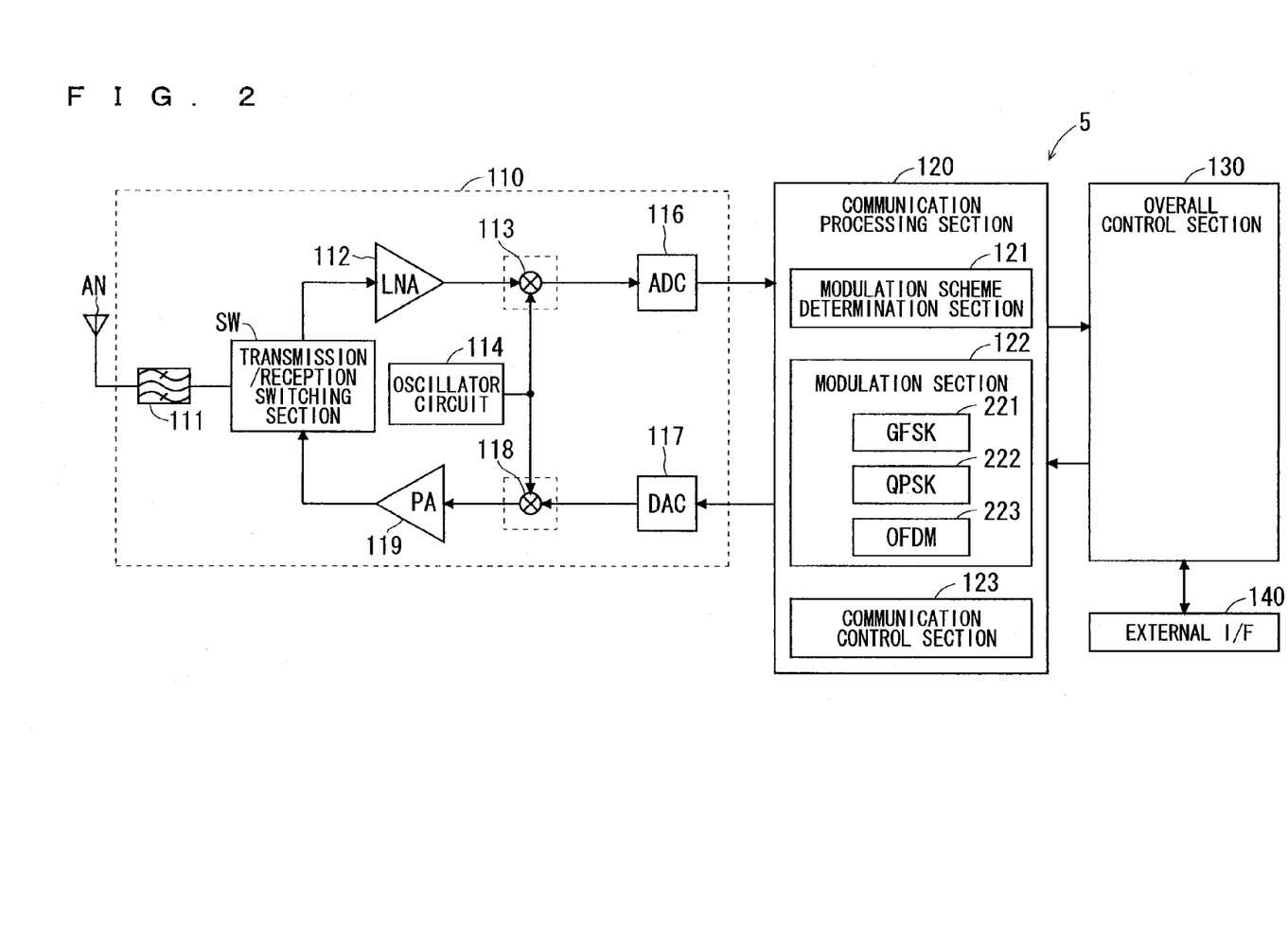
FIG. 2 A block diagram showing a functional configuration of a first communication device.

Next, functions of the first communication device 5 included in the communication system 1 will be described. FIG. 2 is a block diagram showing a functional configuration of the first communication device 5.

As shown in FIG. 2, the communication device 5 includes a communication section 110 connected to an antenna element AN, a communication processing section 120, an overall control section 130, and an external I/F 140 for the connection with an external apparatus (for example, an external storage device).

The communication section 110 cooperates with the antenna element AN to perform wireless communication with an external communication device (here, the second communication device 10A). More specifically, the communication section 110 receives data transmitted from the second communication device 10A via the antenna element AN, and outputs the reception signal to the communication processing section 120. The communication section 110 wirelessly transmits transmission signal inputted from the communication processing section 120, to the second communication device 10A via the antenna element AN.

Here, a process in the communication section 110 performed in the wireless communication will be described. The description will be given separately for a reception process and a transmission process.

In the reception process, a band-pass filter 111 extracts a reception signal that is a processing object, from signals received by the antenna element AN, and then outputs the extracted signal. The reception signal outputted from the band-pass filter 111 is inputted to a low noise amplifier (LNA: Low Noise Amplifier) 112 via a transmission/reception switching section SW.

The low noise amplifier 112 amplifies the inputted reception signal, and outputs the amplified signal. The reception signal outputted from the low noise amplifier 112 is inputted to a mixer 113.

The mixer 113 multiplies the reception signal by a reference signal having a predetermined frequency that is outputted from an oscillator circuit 114, and converts the frequency band of the reception signal into a lower frequency band (here, a baseband). The baseband reception signal outputted from the mixer 113 is inputted to an A/D conversion circuit 116.

The A/D conversion circuit 116 converts the inputted reception signal in analog form into a reception signal in digital form, and outputs the reception signal in digital form to the communication processing section 120.

In the transmission process, a D/A conversion circuit 117 converts a transmission signal received from the communication processing section 120, from a transmission signal in digital form into a transmission signal in analog. The transmission signal in analog form outputted from the D/A conversion circuit 117 is inputted to the mixer 118.

The mixer 118 multiplies the transmission signal by a reference signal outputted from the oscillator circuit 114, and converts the frequency band of the transmission signal into a higher frequency band (here, a carrier band). The carrier-band transmission signal outputted from the mixer 118 is inputted to a power amplifier (PA) 119.

The power amplifier 119 amplifies the inputted transmission signal, and outputs the amplified signal. The transmission signal outputted from the power amplifier 119 is inputted to the band-pass filter 111 via the transmission/reception switching section SW.

The band-pass filter 111 performs a predetermined filtering process on the inputted transmission signal, to thereby eliminate an unnecessary signal from the transmission signal. The transmission signal outputted from the band-pass filter 111 is outputted as a radio signal via the antenna element AN.

In this manner, the communication section 110 converts the frequency band of a received radio signal to output a baseband reception signal, and also converts the frequency of a transmission signal to output a carrier band transmission signal as a radio signal.

Next, the communication processing section 120 will be described. The communication processing section 120, which performs a baseband process and the like, is configured as a DSP (Digital Signal Processor), for example. The DSP reads out a program that is stored in a storage section (not shown) attached to the DSP, and executes the program, thereby implementing various function sections.

To be specific, in the communication processing section 120, a modulation scheme determination section 121, a modulation section 122, and a communication control section 123 are functionally implemented.

The modulation scheme determination section 121 determines a modulation scheme to be used in superimposing transmission data on a carrier wave. The determination of the modulation scheme is made in accordance with, for example, whether or not there is an ACK (ACKnowledgement) that is transmitted from the receiver side upon normal completion of data transfer. In more detail, when the ACK is received from the receiver side in response to the transmission data that the first communication device 5 has wirelessly transmitted by using a certain modulation scheme (first modulation scheme), the modulation scheme determination section 121 determines that this certain modulation scheme is to be used for wireless communication. When no ACK is received from the receiver side in response to the transmission data that has been wirelessly transmitted by using the certain modulation scheme (first modulation scheme), the modulation scheme determination section 121 wirelessly transmits the transmission data by using a modulation scheme different from this certain modulation scheme and then detects whether or not there is the ACK, thereby determining the modulation scheme.

The modulation section 122 performs a modulation (modulation process) for superimposing the transmission data received from the overall control section 130 (which will be described later) on the carrier wave, and outputs a modulation signal (here, a transmission signal).

The modulation section 122 is able to perform the modulation in a plurality of different modulation schemes. More specifically, the modulation section 122 includes a GFSK modulation section 221 that performs the modulation process in the GFSK (Gaussian Frequency Shift Keying) as a first modulation scheme, a QPSK modulation section 222 that performs the modulation process in the QPSK (Quadrature Phase Shift Keying) as a second modulation scheme, and an OFDM modulation section 223 that performs the modulation process in a multicarrier modulation scheme using the OFDM (also referred to as "OFDM modulation scheme") as a third modulation scheme.

In the first communication device 5 including the modulation section 122 configured as described above, the modulation process is performed by one of the modulation sections 221 to 223 that is in accordance with the modulation scheme determined by the modulation scheme determination section 121.

The communication control section 123 controls a communication operation of the first communication device 5. More specifically, the communication control section 123 switches the transmission/reception switching section SW in accordance with transmission or reception, and selects any of the modulation sections 221 to 223 in accordance with the modulation scheme determined by the modulation scheme determination section 121.

The overall control section 130 is configured as a micro computer, and mainly includes a CPU, a RAM, a ROM (all of which are not shown), and the like. The overall control section 130 reads out a program that is stored in the ROM, and executes the program in the CPU, thereby functionally implementing various functions to perform an overall control of the first communication device 5.

In this manner, the first communication device 5 determines the optimum modulation scheme in accordance with a change of communication environments, and dynamically switches the modulation scheme to transmit the radio signal.

[1-3. Second Communication Device]

Figure 3:
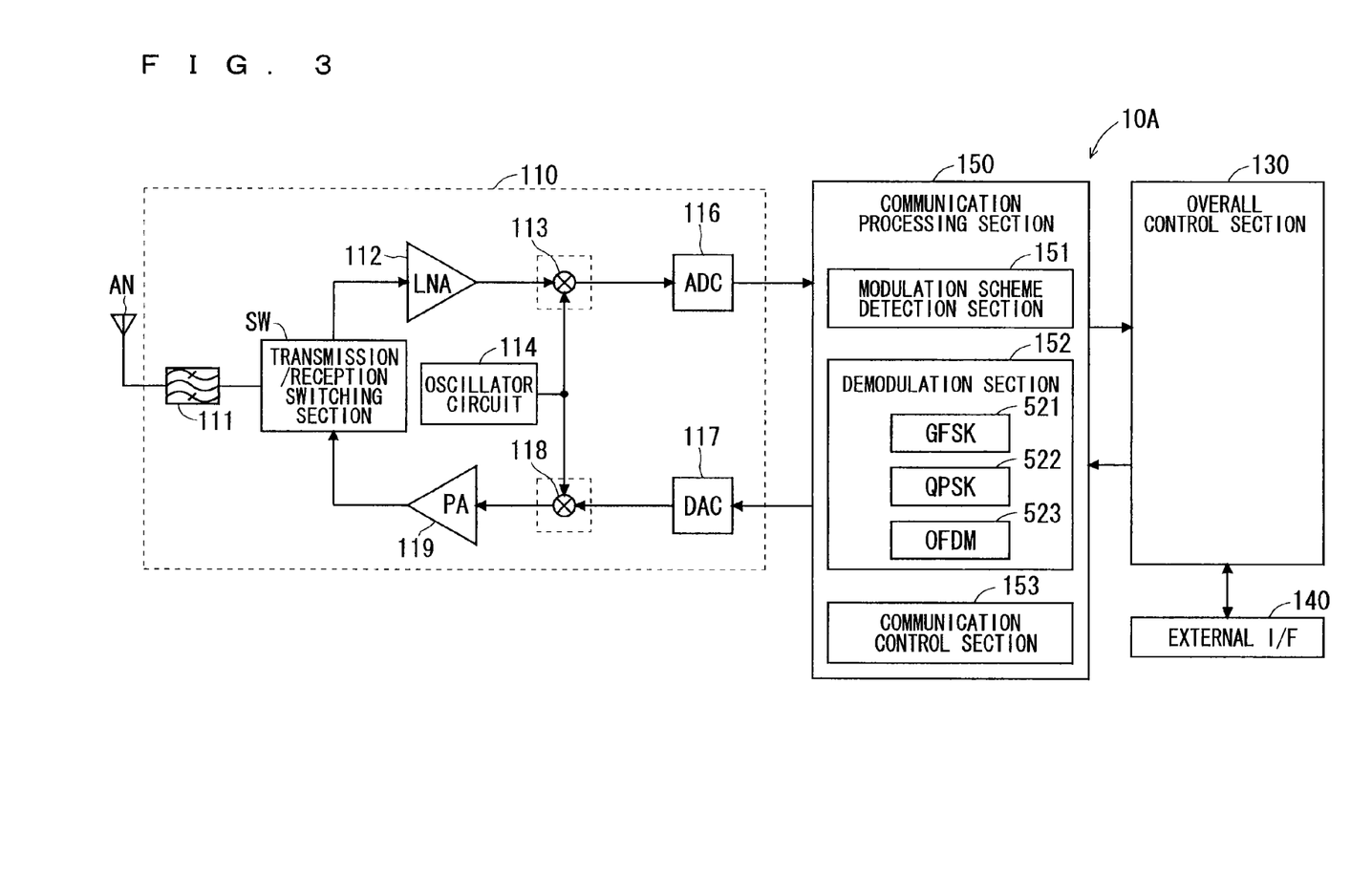
FIG. 3 A block diagram showing a functional configuration of a second communication device according to a first embodiment.

Next, functions of the second communication device 10A included in the communication system 1 will be described. FIG. 3 is a block diagram showing a functional configuration of the second communication device 10A.

As shown in FIG. 3, the second communication device 10A includes a communication section 110 connected to an antenna element AN, a communication processing section 150, an overall control section 130, and an external I/F 140 for the connection with an external apparatus. The second communication device 10A has substantially the same configuration and functions as those of the first communication device 5, except for the configuration of the communication processing section 150. Thus, the same parts are given the same reference numerals, and descriptions thereof are omitted.

The communication processing section 150 of the second communication device 10A, which performs a baseband process and the like, is configured as a DSP, for example. The DSP reads out a program that is stored in a storage section (not shown) attached to the DSP, and executes the program, thereby implementing various function sections.

To be specific, in the communication processing section 150, a modulation scheme detection section 151, a demodulation section 152, and a communication control section 153 are functionally implemented.

The modulation scheme detection section 151 detects the modulation scheme of a radio signal that is transmitted from the first communication device 5 and received by the second communication device 10A. A modulation scheme detection process will be described later.

The demodulation section 152 performs a demodulation (demodulation process) for extracting transmission data from a reception signal received from the communication section 110.

The demodulation section 152 is able to perform the demodulation in a plurality of different demodulation scheme. More specifically, the demodulation section 152 includes a GFSK demodulation section 521 that performs the demodulation process in a demodulation scheme corresponding to the GFSK as the first modulation scheme, a QPSK demodulation section 522 that performs the demodulation process in a demodulation scheme corresponding to the QPSK as the second modulation scheme, and an OFDM demodulation section 523 that performs the demodulation process in a demodulation scheme corresponding to the OFDM modulation scheme as the third modulation scheme.

In the second communication device 10A including the demodulation section 152 configured as described above, the demodulation process is performed by one of the demodulation sections 521 to 523 that is in accordance with the modulation scheme detected by the modulation scheme detection section 151, under control by the communication control section 153.

[1-4. Modulation Scheme Detection Process]

Figure 4:
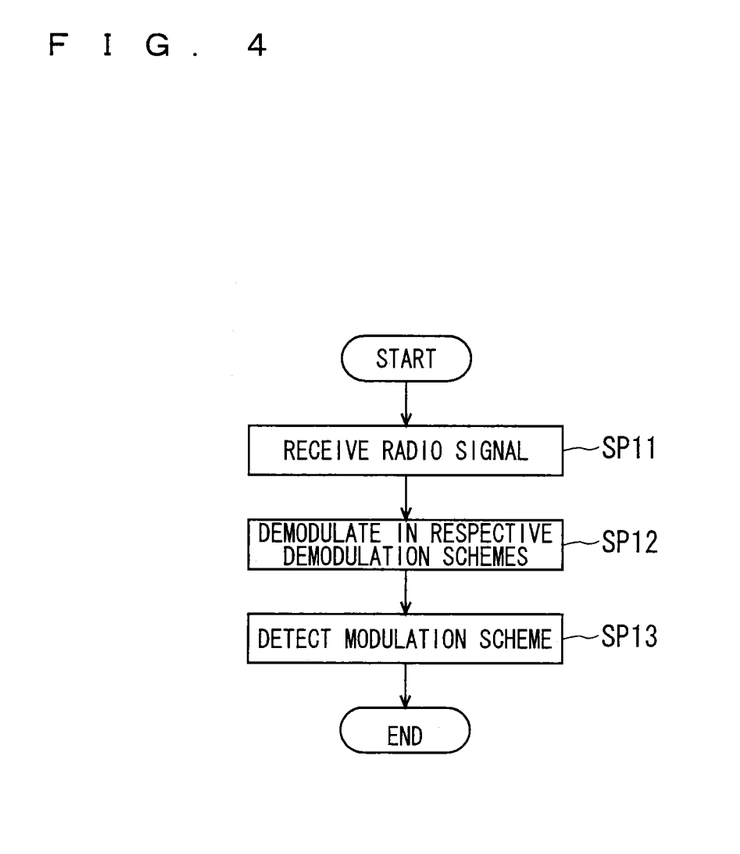
FIG. 4 A flowchart of a modulation scheme detection process.
Figure 5:
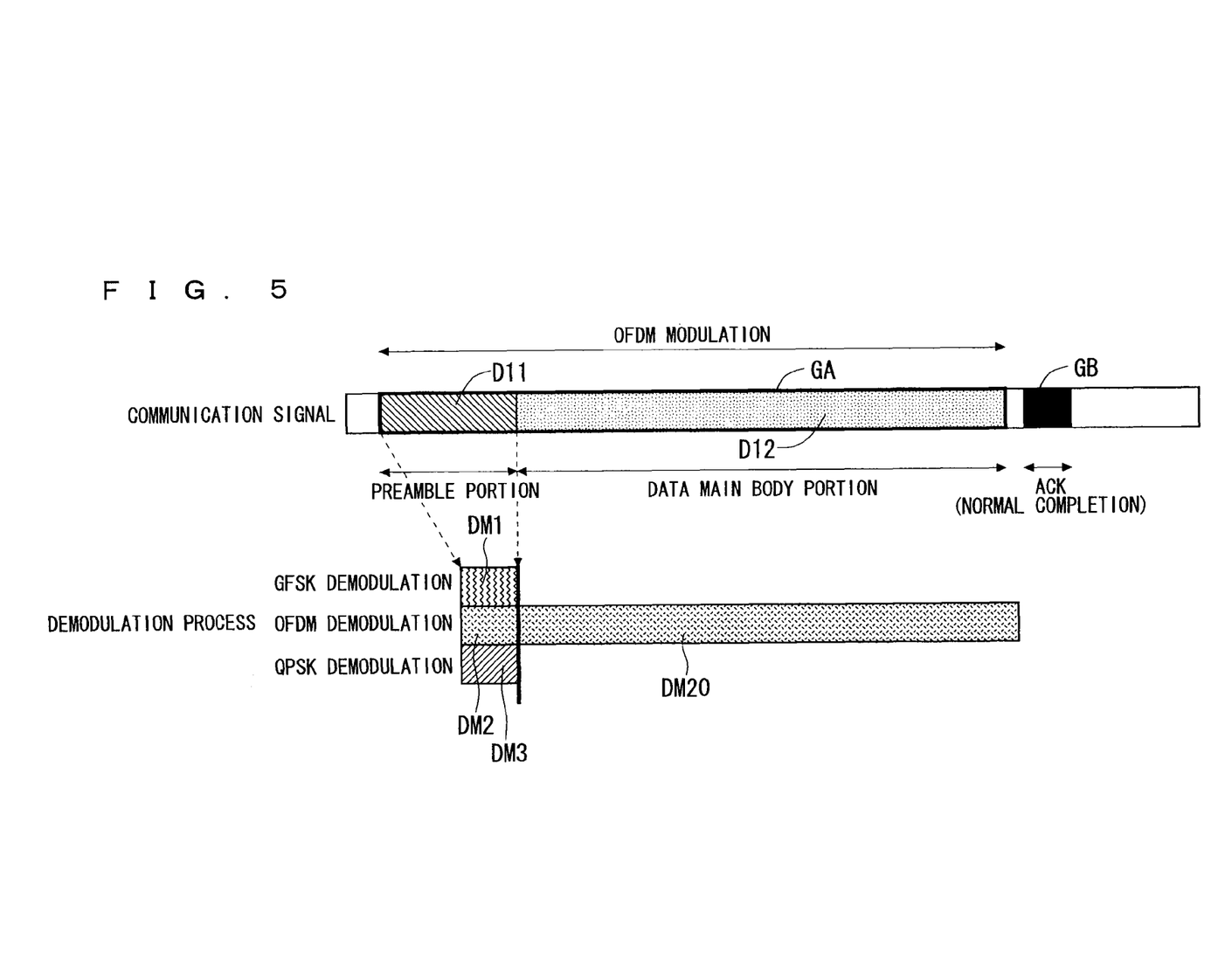
FIG. 5 A diagram showing, in chronological order, a communication signal that is transmitted and a demodulation process in the second communication device according to the first embodiment.

Next, the modulation scheme detection process performed by the second communication device 10A will be described in detail. FIG. 4 shows a flowchart of the modulation scheme detection process. FIG. 5 is a diagram showing, in chronological order, a communication signal that is transmitted and the demodulation process in the second communication device 10A. In FIG. 5, the communication signal that is transmitted includes a communication signal GA transmitted from the first communication device 5 to the second communication device 10A and a communication signal GB transmitted from the second communication device 10A to the first communication device 5. The communication signal GA includes a preamble portion D11 and a data main body portion D12. In FIG. 5, it is assumed that the communication signal GA is a signal that is modulated in the OFDM modulation scheme by the first communication device 5.

As shown in FIG. 4, in the modulation scheme detection process in the second communication device 10A, firstly in step SP11, a radio signal reception process is performed. A received radio signal is, as a reception signal (communication signal that is received), outputted to the communication processing section 150 through the communication section 110.

In step SP12, the demodulation section 152 performs the demodulation process in all the demodulation schemes. To be specific, as shown in FIG. 5, a signal in the preamble portion D11 within the communication signal GA is subjected to demodulation processes DM1 to DM3 by the GFSK demodulation section 521, the QPSK demodulation section 522, and the OFDM demodulation section 523, respectively. The preamble portion D11 of the communication signal GA includes known information that has been defined in advance. Since the known information is used for the determination of the modulation scheme, it is also referred to as "modulation scheme determination information". The modulation scheme determination information may be, for example, pattern data such as "55AA". In a case where the pattern data is used as the modulation scheme determination information, the pattern data is held as common information in the first communication device 5 and in the second communication device 10A.

The data (also referred to as "demodulation data") extracted (obtained) as a result of the demodulation processes DM1 to DM3 in step SP12 are inputted to the modulation scheme detection section 151.

Then, in next step SP13, the modulation scheme detection section 151 detects a modulation scheme of the communication signal GA based on the inputted demodulation data. The detection of the modulation scheme is performed based on the identification of which of the demodulation data that the modulation scheme detection section 151 has received from the demodulation sections 521 to 523 includes the modulation scheme determination information that is held in advance in the second communication device 10A.

More specifically, in a case where the demodulation is performed in the demodulation scheme corresponding to the modulation scheme of the communication signal GA, the modulation scheme determination information included in the preamble portion D11 of the communication signal GA is accurately replicated in the second communication device 10A. Accordingly, which of the demodulation sections 521 to 523 has accurately demodulated the modulation scheme determination information can be identified by identifying which of the demodulation data concerning the preamble portion D11 includes the modulation scheme determination information. Thereby, the modulation scheme of the communication signal GA can be detected.

For example, in FIG. 5, the communication signal GA is a signal modulated in the OFDM modulation scheme. Therefore, the modulation scheme determination information is accurately replicated in the demodulation data obtained as a result of the OFDM demodulation process DM2 among the demodulation processes DM1 to DM3. Thus, the modulation scheme detection section 151 detects that the modulation scheme is the OFDM modulation scheme.

After the modulation scheme of the communication signal is detected in step SP13, a signal in the data main body portion D12 is subjected to the demodulation process in the demodulation scheme corresponding to the detected modulation scheme. For example, in FIG. 5, the OFDM demodulation section 523 performs a demodulation process DM20 on the signal in the data main body portion D12. After the demodulation process DM20 performed on the signal in the data main body portion D12 is completed so that the transmission data is obtained, the ACK indicating the normal completion of data transfer is, as the communication signal GB, transmitted from the second communication device 10A to the first communication device 5.

As described above, in the communication system 1, the first communication device 5 as the transmitter dynamically switches the modulation scheme in accordance with the communication environments, and thereby the wireless transmission is performed using the optimum modulation scheme. On the other hand, in the second communication device 10A as the receiver, the received communication signal is subjected to the demodulation processes in the demodulation schemes corresponding to the respective modulation schemes that can be adopted in the communication system 1. Then, the second communication device 10A automatically detects the modulation scheme based on a result of the demodulation of the communication signal performed in the demodulation processes in the respective demodulation schemes (in more detail, based on a result of the demodulation of the modulation scheme determination information included in the communication signal).

This enables the receiver side to automatically detect the modulation scheme even in a case where the transmitter side has changed the modulation scheme in accordance with the communication environments and the receiver has not been notified of the modulation scheme adopted after the change. Therefore, the stable communication performance is ensured.

2. Second Embodiment

Figure 6:
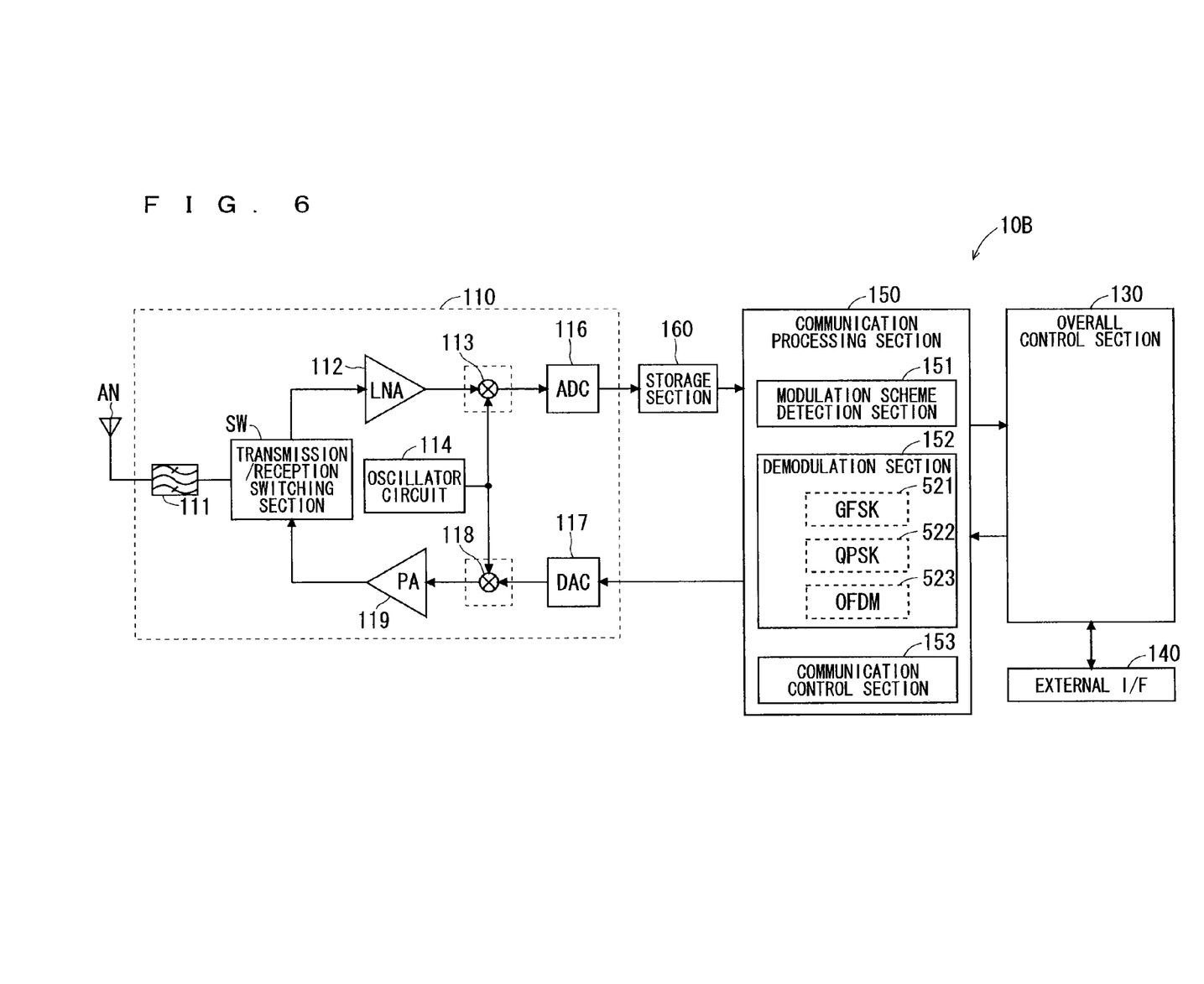
FIG. 6 A block diagram showing a functional configuration of a second communication device according to a second embodiment.

Next, a second embodiment of the present invention will be described. A second communication device 10B according to the second embodiment further has substantially the same structure and function as those of the second communication device 10A, except that a storage section 160 is further provided and the demodulation section 152 functionally implements any one of the GFSK demodulation section 521, the QPSK demodulation section 522, and the OFDM demodulation section 523. The same parts are denoted by the same reference numerals, and descriptions thereof are omitted. FIG. 6 is a block diagram showing a functional configuration of the second communication device 10B according to the second embodiment.

As shown in FIG. 6, the second communication device 10B has a storage section 160 provided between the A/D conversion circuit 116 and the communication processing section 150. The storage section 160 is configured as, for example, a RAM, and functions as a buffer that temporarily stores the reception signal outputted from the A/D conversion circuit 116.

In the demodulation section 152 of the second communication device 10B, any one of the GFSK demodulation section 521, the QPSK demodulation section 522, and the OFDM demodulation section 523 is functionally implemented. More specifically, under control by the communication control section 153, the communication processing section 150 reads out a program for implementing the demodulation process in a desired demodulation scheme, and then executes the program, thereby implementing any one of the GFSK demodulation section 521, the QPSK demodulation section 522, and the OFDM demodulation section 523.

Thus, in the communication processing section 150, any one demodulation section is implemented. Accordingly, at least part of the hardware that implements the demodulation section 152 can be used as common hardware to implement the demodulation sections 521 to 523.

Figure 7:
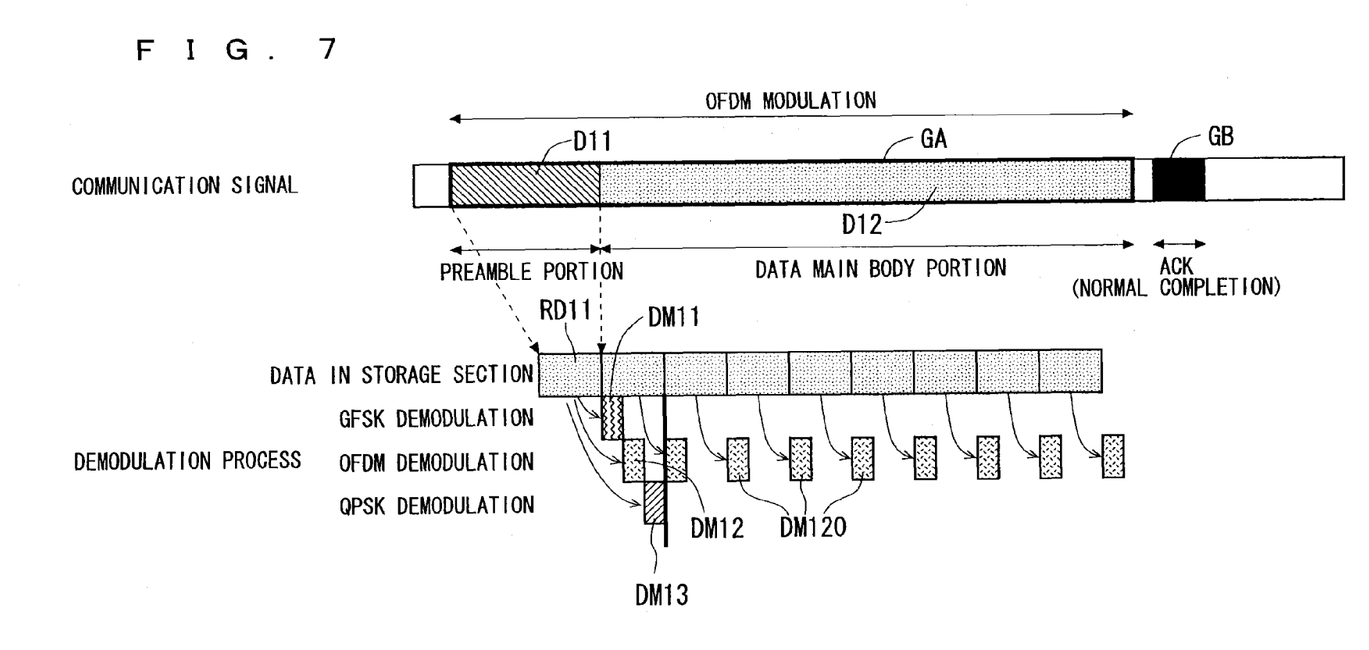
FIG. 7 A diagram showing, in chronological order, a communication signal that is transmitted, data concerning the communication signal which is stored in a storage section, and a demodulation process in the second communication device according to the second embodiment.

Next, a modulation scheme detection process performed by the second communication device 10B configured as described above will be described in detail. FIG. 7 is a diagram showing, in chronological order, a communication signal that is transmitted, data concerning the communication signal which is stored in the storage section 160, and a demodulation process in the second communication device 10B. In FIG. 7, the communication signal that is transmitted includes a communication signal GA transmitted from the first communication device 5 to the second communication device 10B, and a communication signal GB transmitted from the second communication device 10B to the first communication device 5. The communication signal GA includes a preamble portion D11 and a data main body portion D12. In FIG. 7, it is assumed that the communication signal GA is a signal that is modulated in the OFDM modulation scheme by the first communication device 5.

In the modulation scheme detection process in the second communication device 10B, firstly, a radio signal reception process is performed. A received radio signal is, as a reception signal (communication signal that is received), temporarily stored in the storage section 160 through the communication section 110. A signal in the preamble portion D11 within the communication signal GA is firstly stored in the storage section 160.

In the demodulation section 152, under control by the communication control section 153, the demodulation sections 521 to 523 that perform the demodulation process in the respective demodulation schemes are sequentially implemented. Then, each time any of the demodulation sections 521 to 523 is implemented, the signal in the preamble portion D11 is read out from the storage section 160 and inputted to the any of demodulation sections 521 to 523, so that the implemented demodulation section performs the demodulation process.

For example, FIG. 7 shows a situation in which the GFSK demodulation section 521 is firstly implemented and a signal RD11 in the preamble portion D11 is inputted from the storage section 160 to the GFSK demodulation section 521 so that the signal RD11 is subjected to a demodulation process DM11 in a demodulation scheme corresponding to the GFSK. The demodulation data extracted as a result of the demodulation process DM11 performed by the GFSK demodulation section 521 is inputted to the modulation scheme detection section 151.

After the demodulation process DM11 performed by the GFSK demodulation section 521 is completed, then the OFDM demodulation section 523 is implemented so that the signal RD11 in the preamble portion D11, which is received from the storage section 160, is subjected to a demodulation process DM12 in a demodulation scheme corresponding to the OFDM modulation scheme. The demodulation data extracted as a result of the demodulation process DM12 performed by the OFDM demodulation section 523 is inputted to the modulation scheme detection section 151.

After the demodulation process DM12 performed by the OFDM demodulation section 523 is completed, then the QPSK demodulation section 522 is implemented so that the signal RD11 in the preamble portion D11, which is received from the storage section 160, is subjected to a demodulation process DM13 in a demodulation scheme corresponding to the QPSK modulation scheme. The demodulation data extracted as a result of the demodulation process DM13 performed by the OFDM demodulation section 522 is inputted to the modulation scheme detection section 151.

In the demodulation sections 521 to 523 of the second communication device 10B, the demodulation process is performed at a speed three times faster than a normal speed. This can prevent a delay in the process, even when the demodulation processes are sequentially performed.

After the demodulation processes performed by the demodulation sections 521 to 523 are completed, the modulation scheme detection section 151 detects the modulation scheme of the communication signal GA based on the inputted demodulation data. Similarly to the first embodiment, the detection of the modulation scheme is performed based on the identification of which of the demodulation data that the modulation scheme detection section 151 has received from the demodulation sections 521 to 523 includes the modulation scheme determination information that is held in advance in the second communication device 10B.

After the modulation scheme of the communication signal is detected, a signal in the data main body portion D12 is subjected to the demodulation process in the demodulation scheme corresponding to the detected modulation scheme. For example, in FIG. 7, a signal in the data main body portion D12, which is stored in the storage section 160, is sequentially read out and subjected to a demodulation process DM120 by the OFDM demodulation section 523. After the demodulation process DM120 performed on the signal in the data main body portion D12 is completed and the transmission data is obtained, the ACK indicating the normal completion of data transfer is, as the communication signal GB, transmitted from the second communication device 10B to the first communication device 5. In FIG. 7, in the demodulation process performed on the signal in the data main body portion D12, too, the demodulation process is performed at a speed three times faster than the normal speed. However, for the signal in the data main body portion D12, the demodulation process may be performed at the normal speed.

As described above, in the second communication device 10B according to the second embodiment, the signal in the preamble portion D11 including the modulation scheme determination information is stored in the storage section 160. Thereby, the demodulation sections 521 to 523 that are sequentially implemented can obtain the demodulation data. Accordingly the demodulation data can be obtained in each of the demodulation sections, without the need to simultaneously implementing the demodulation sections. This enables the modulation scheme to be automatically detected with an efficient use of hardware resources that implement the communication processing section 150.

That is, in the second communication device 10B, the hardware that implements the respective demodulation sections 521 to 523 are configured to share at least part of the hardware. To implement any one of the demodulation sections, the communication control section 153 sets the shared hardware so as to implement the one demodulation section. In this manner, the second communication device 10B implements different demodulation sections by using the shared hardware at different times, in other words, by time-sharing the shared hardware as common hardware.

3. Modification

Although an embodiment of the invention has been described above, the invention is not limited to the above-described one.

For example, in the embodiments described above, the pattern data is used as the modulation scheme determination information. However, this is not limiting. More specifically, for example, an ID indicating the modulation scheme may be used as the modulation scheme determination information. In a case of the ID is used as the modulation scheme determination information, the modulation scheme detection section 151 identifies the modulation scheme based on the ID that is obtained as the demodulation data.

Figure 8:
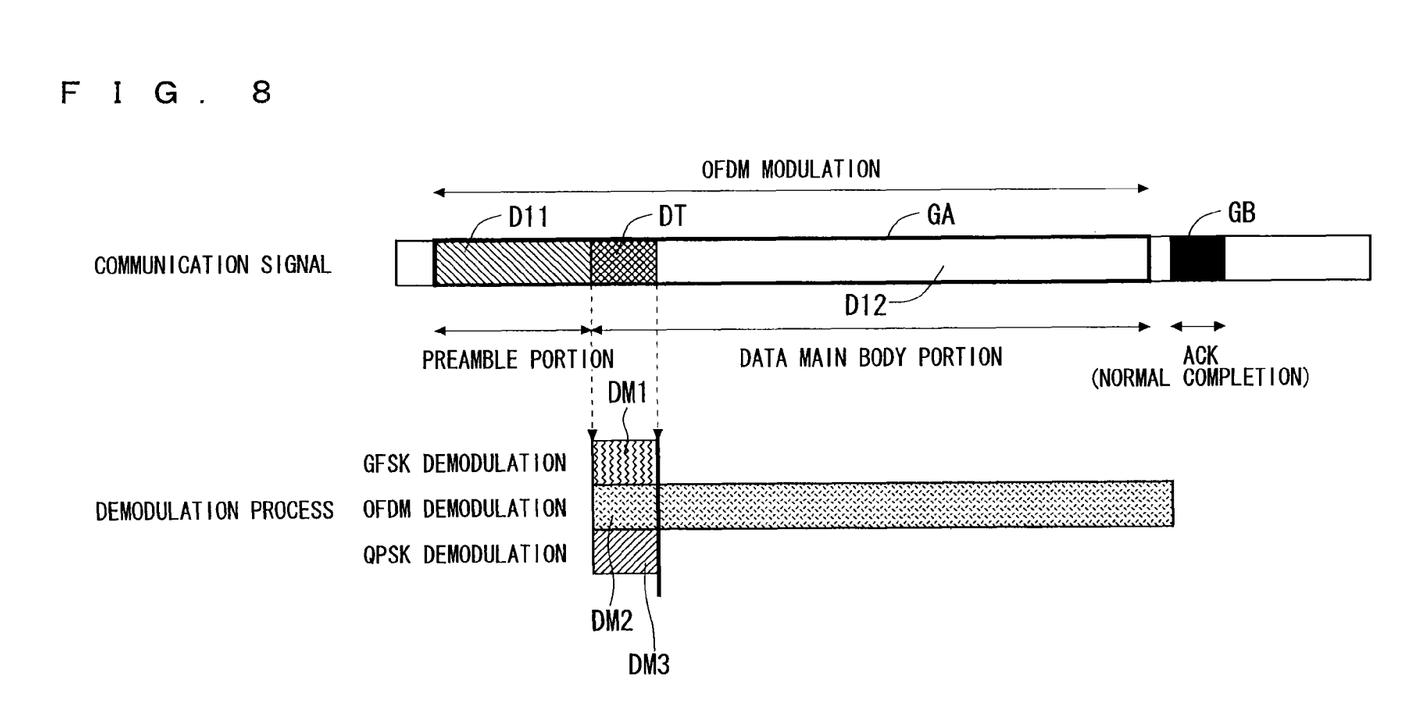
FIG. 8 A diagram showing, in chronological order, a communication signal that is transmitted and a demodulation process in the second communication device.

In the case illustrated in the embodiments above, the modulation scheme determination information is included in the preamble portion D11 of the communication signal GA that is transmitted from the first communication device 5 to the second communication device 10A(10B). However, this is not limiting. FIG. 8 is a diagram showing, in chronological order, a communication signal that is transmitted and a demodulation process in the second communication device 10A(10B).

More specifically, as shown in FIG. 8, modulation scheme determination information protected by CRC, or the like, may be inserted to a beginning portion DT of the data main body portion D12. In this case as well, a signal in the beginning portion DT of the data main body portion D12 is subjected to the demodulation processes DM1 to DM3 by the demodulation sections 521 to 523, so that the modulation scheme determination information is obtained.

Figure 9:
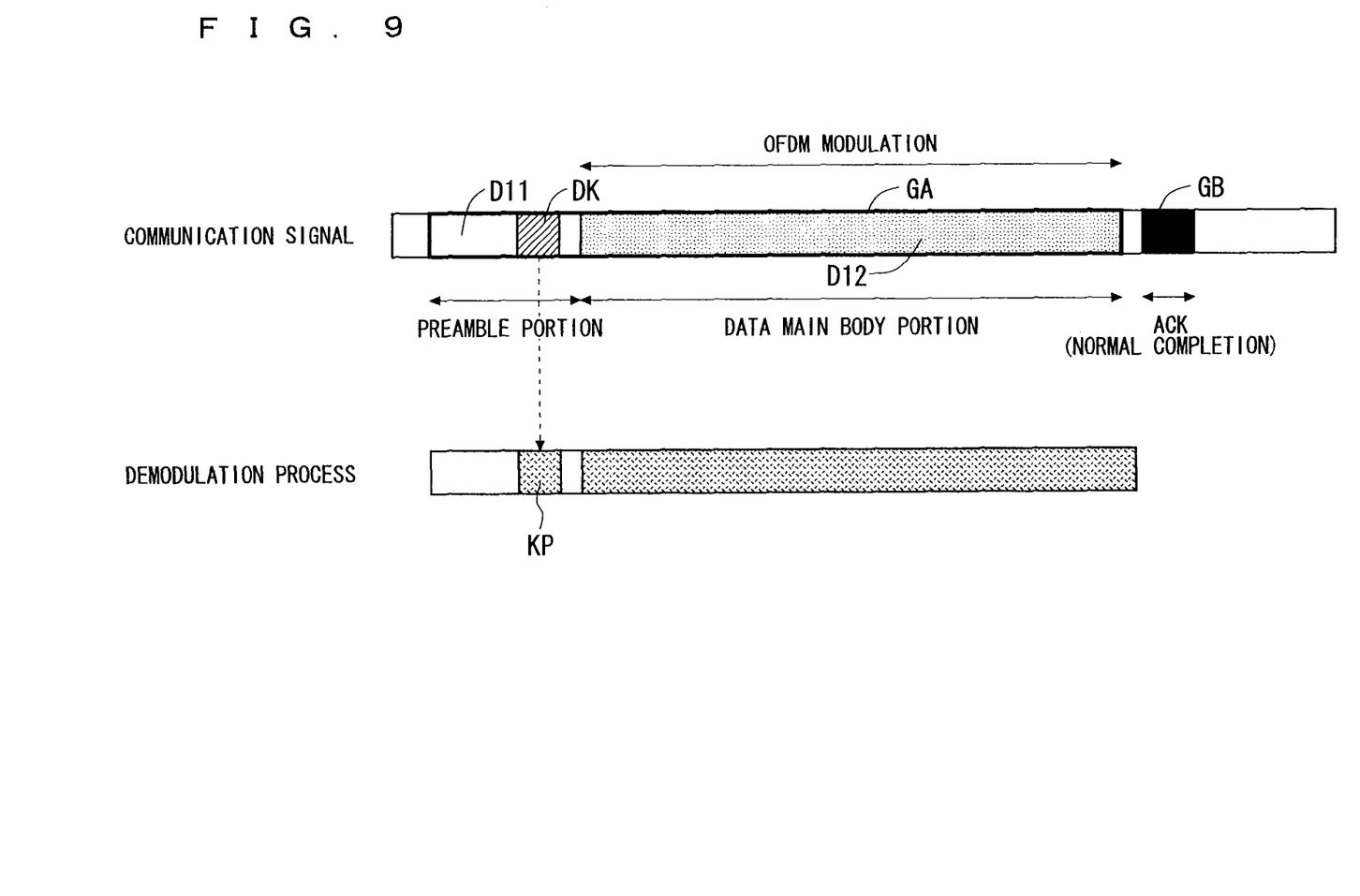
FIG. 9 A diagram showing, in chronological order, a communication signal that is transmitted and a demodulation process in the second communication device.

It may be also possible that a part of the communication signal GA transmitted from the first communication device 5 to the second communication device 10A(10B) is modulated by using the OOK (On Off Keying) to thereby indicate the modulation scheme determination information. FIG. 9 is a diagram showing, in chronological order, a communication signal that is transmitted and a demodulation process in the second communication device 10A(10B).

To be specific, as shown in FIG. 9, a part DK of the communication signal GA (for example, the preamble portion D11 of the communication signal GA) is modulated by using the OOK, and the modulation scheme determination information is embedded in the part DK. In this case, the modulation scheme detection section 151 of the second communication device 10A(10B) detects an on/off pattern in processing KP associated with the part DK of the communication signal GA. Thereby, the modulation scheme of the communication signal GA is identified.

In the embodiment described above, the communication processing section 120, 150 is configured with the DSP. However, this it not limiting. To be specific, the function sections implemented in the communication processing section 120, 150 may be partially or wholly configured as hardware. More specifically, for example, it may be acceptable that a common part in each demodulation scheme adopted in the demodulation section 152 of the communication processing section 150 is configured as predetermined hardware while setting of parameters of the hardware, switching of a path, an operation procedure, and the like, are controlled by means of a programmable logic controller (PLC: Programmable Logic Controller). This achieves a hardware configuration specialized in the function of the communication processing section, and therefore can reduce the overhead as compared with the use of the DSP.

In the embodiments described above, the first communication device 5 determines the modulation scheme in accordance with the presence or absence of the ACK that is sent back from the receiver side in response. However, this is not limiting. More specifically, it may be acceptable that the modulation scheme determination section 121 determines the optimum modulation scheme based on the reception sensitivity of the first communication device 5 in receiving the radio signal from the receiver side, the bit error rate of the radio signal transmitted from the receiver side, or information concerning an operation state (such as the presence or absence of a failure) of the receiver side communication device (here, the second communication device 10A(10B)) which is transmitted from the receiver side.

Alternatively, the optimum modulation scheme may be determined by, at a time of performing carrier sensing before starting wireless communication, receiving a radio signal from the second communication device 10A and detecting, in the modulation scheme determination section 121, radio wave environments based on the radio signal.

In the case illustrated in the embodiments above, the GFSK, the QPSK, and the OFDM modulation schemes are adopted as the modulation scheme. However, this is not limiting. Other modulation schemes such as the BPSK (Binary Phase Shift Keying) are adoptable.

In the second embodiment described above, the demodulation sections 521 to 523 of the second communication device 10B perform the demodulation processes at a speed three times faster than the normal speed. However, this is not limiting. The speed of the demodulation process is varied in accordance with the number of demodulation sections implemented in the communication processing section 150. That is, when the number of demodulation sections implemented is defined as "N", the speed of the demodulation processes performed by the respective demodulation sections is N times faster than the normal speed. In this manner, varying the speed of the demodulation process in accordance with the number of demodulation sections implemented in the communication processing section 150 can prevent a process delay even in a case where the demodulation processes are sequentially performed.

In the second communication device 10 according to the embodiments described above, the demodulation process is performed in each of the demodulation schemes corresponding to all the modulation schemes adoptable by the communication system 1, to obtain the demodulation data, and the modulation scheme of the radio signal is identified based on this demodulation data. However, this is not limiting.

More specifically, if the number "M" of modulation schemes used in the communication system 1 is given, the modulation scheme of the radio signal can be identified by performing the demodulation process in the demodulation schemes corresponding to the "M−1" modulation schemes.

For example, in a case where the number of modulation schemes used in the communication system 1 is "2", the demodulation process is performed in one demodulation scheme corresponding to one modulation scheme, and the demodulation data obtained as a result of this demodulation process is inputted to the modulation scheme detection section 151. Then, the modulation scheme detection section 151 detects the modulation scheme of the radio signal based on whether or not the modulation scheme determination information has been accurately replicated in the demodulation data. That is, in a case where the modulation scheme determination information has been accurately replicated as a result of the demodulation process in the aforesaid one demodulation scheme, the modulation scheme detection section 151 detects that the modulation scheme of the radio signal is the aforesaid one modulation scheme. In a case where the modulation scheme determination information has not been accurately replicated as a result of the demodulation process in the aforesaid one demodulation scheme, the modulation scheme detection section 151 detects that the modulation scheme of the radio signal is a modulation scheme other than the aforesaid one modulation scheme.

The communication device 5, 10A(10B) according to the embodiments described above may be used as a component part of a communication network in a smart grid that is a next-generation power grid. In this case, the communication device 5, 10A(10B) performs wireless communication in accordance with a communication protocol that defines rules for communication in the smart grid.

While the invention has been described in detail, the foregoing description is in all aspects illustrative and not restrictive. It is therefore understood that numerous modifications and variations not illustrated herein can be devised without departing from the scope of the invention.

DESCRIPTION OF THE REFERENCE NUMERALS 1 communication system
5 first communication device
10A, 10B second communication device
130 overall control section
150 communication processing section
151 modulation scheme detection section
152 demodulation section
153 communication control section
160 storage section

The invention claimed is:

1. A communication device comprising:
a reception element that receives a radio signal modulated in a first modulation scheme or a second modulation scheme from a communication partner device, said radio signal including a preamble portion at a beginning of the radio signal followed by a data portion;
a storage element that stores said radio signal received by said reception element;
a demodulation element that performs a demodulation process on said radio signal outputted from said storage element;
a control element that implements any one of a first demodulation scheme and a second demodulation scheme in said demodulation element by controlling setting of said demodulation element, said first demodulation scheme corresponding to said first modulation scheme and said second demodulation scheme corresponding to said second modulation scheme; and
a modulation scheme detection element that detects a modulation scheme of said radio signal, wherein
said preamble portion of said radio signal includes a modulated message that corresponds to predetermined information supplied to the communication device,
said control element sequentially implements said first demodulation scheme and said second demodulation scheme by itself without receiving, by said reception element, instructions from said communication partner device, and
said modulation scheme detection element detects the modulation scheme of said radio signal based on results of demodulation of said preamble portion that are sequentially obtained by demodulation according to said first demodulation scheme and said second demodulation scheme.

2. The communication device according to claim 1, wherein
hardware of said demodulation element implements said first demodulation scheme and said second demodulation scheme, and
said control element controls setting of said hardware.

3. The communication device according to claim 2, wherein said communication device performs wireless communication in accordance with a communication protocol that defines rules for communication in a smart grid.

4. The communication device according to claim 1, further comprising a transmitter that, upon completion of the reception of said radio signal by the reception element, transmits an acknowledgement message using a same modulation scheme as the modulation scheme of said radio signal.

5. The communication device according to claim 1, wherein
said radio signal received by said reception element is modulated in the first modulation scheme, the second modulation scheme or a third modulation scheme, said control element implements any one of the first demodulation scheme, the second demodulation scheme and a third demodulation scheme, said third demodulation scheme corresponding to the third modulation scheme, and said modulation scheme detection element detects said modulation scheme of said radio signal based on results of demodulation of said preamble portion performed according to said first, second, or third demodulation scheme.

6. The communication device according to claim 1, further comprising a modulation scheme determination element that determines, based on the detection of the modulation scheme detection element, whether the modulation scheme of the radio signal corresponds to the first demodulation scheme or whether the modulation scheme of the radio signal corresponds to the second demodulation scheme, wherein the demodulation element demodulates the data portion according to the first demodulation scheme when the modulation scheme of the radio signal corresponds to the first demodulation scheme, and the demodulation element demodulates the data portion according to the second demodulation scheme when the modulation scheme of the radio signal corresponds to the scheme demodulation scheme.

7. The communication device according to claim 4, further comprising a modulation scheme determination element that determines, based on the detection of the modulation scheme detection element, whether the modulation scheme of the radio signal corresponds to the first demodulation scheme or whether the modulation scheme of the radio signal corresponds to the second demodulation scheme, wherein the demodulation element demodulates the data portion according to the first demodulation scheme when the modulation scheme of the radio signal corresponds to the first demodulation scheme, and the demodulation element demodulates the data portion according to the second demodulation scheme when the modulation scheme of the radio signal corresponds to the scheme demodulation scheme.

8. The communication device according to claim 7, wherein the transmitter transmits the acknowledgement message using the modulation scheme determined by the modulation scheme determination element.

9. A communication device comprising:
a reception element that receives a radio signal modulated in a first modulation scheme or a second modulation scheme;
a first demodulation element that demodulates said radio signal in a first demodulation scheme corresponding to said first modulation scheme;
a modulation scheme detection element that detects a modulation scheme of said radio signal; and
a transmitter that transmits an acknowledgement message after completion of the reception of said radio signal by the reception element, the acknowledgment message using a same modulation scheme as the modulation scheme of said radio signal, wherein
said radio signal includes predetermined information, and
said modulation scheme detection element detects only the modulation scheme of said radio signal based on whether or not said first demodulation element has accurately demodulated said predetermined information.

10. The communication device according to claim 9, wherein when said first demodulation element has accurately demodulated said predetermined information, said modulation scheme detection element detects that the modulation scheme of said radio signal is said first modulation scheme, and when said first demodulation element has not accurately demodulated said predetermined information, said modulation scheme detection element detects that the modulation scheme of said radio signal is said second modulation scheme.

11. The communication device according to claim 9, further comprising a storage element that stores said radio signal received by said reception element, wherein the first demodulation element demodulates said radio signal outputted from said storage element.

* * * * *